Feb. 10, 1942.        H. S. JANDUS        2,272,174
BRAKE LEVER
Filed Jan. 20, 1940        3 Sheets-Sheet 1
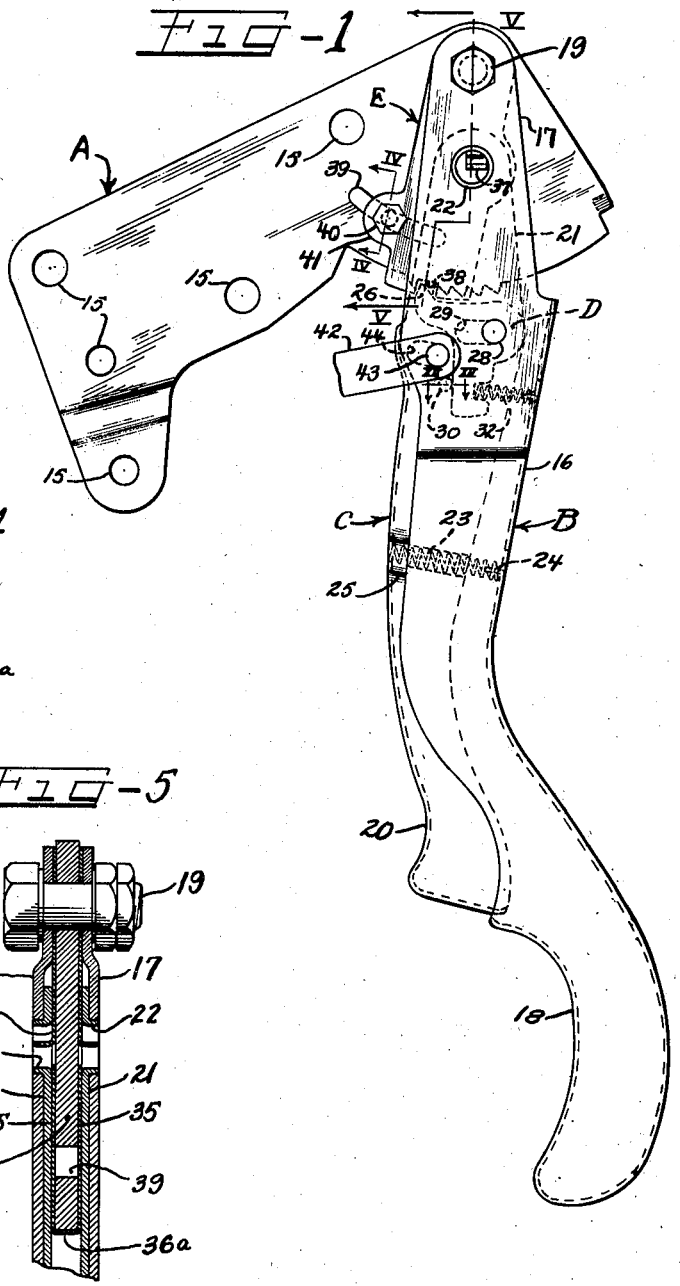
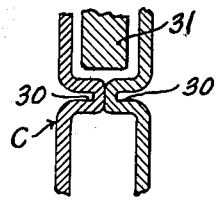
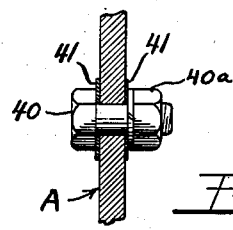
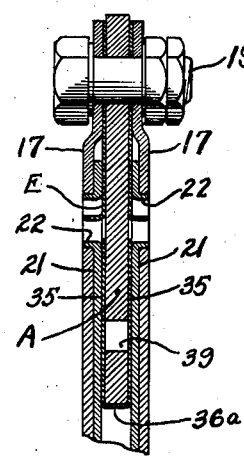
Inventor
Herbert S. Jandus

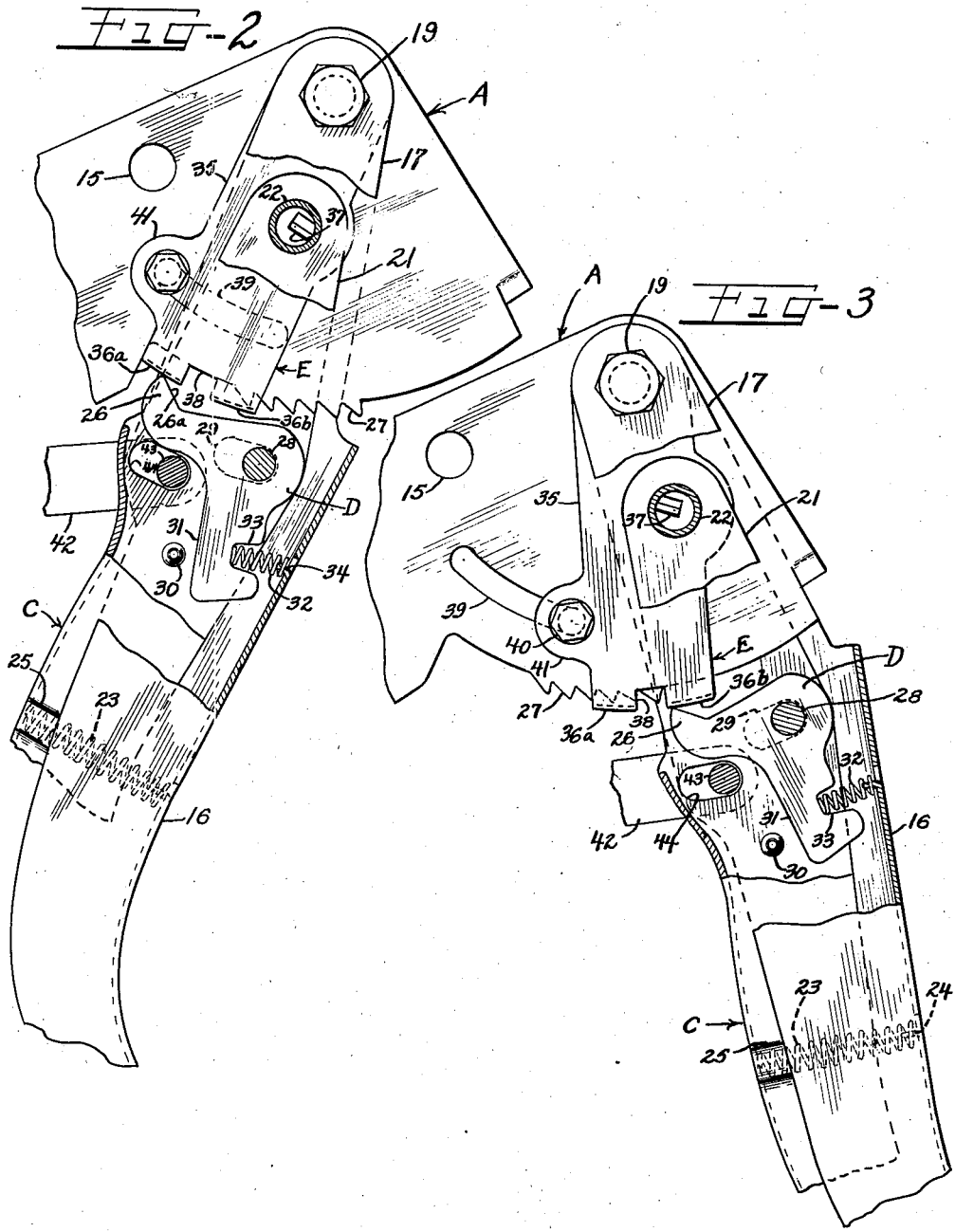

Feb. 10, 1942.                H. S. JANDUS                 2,272,174
                              BRAKE LEVER
                          Filed Jan. 20, 1940            3 Sheets-Sheet 3
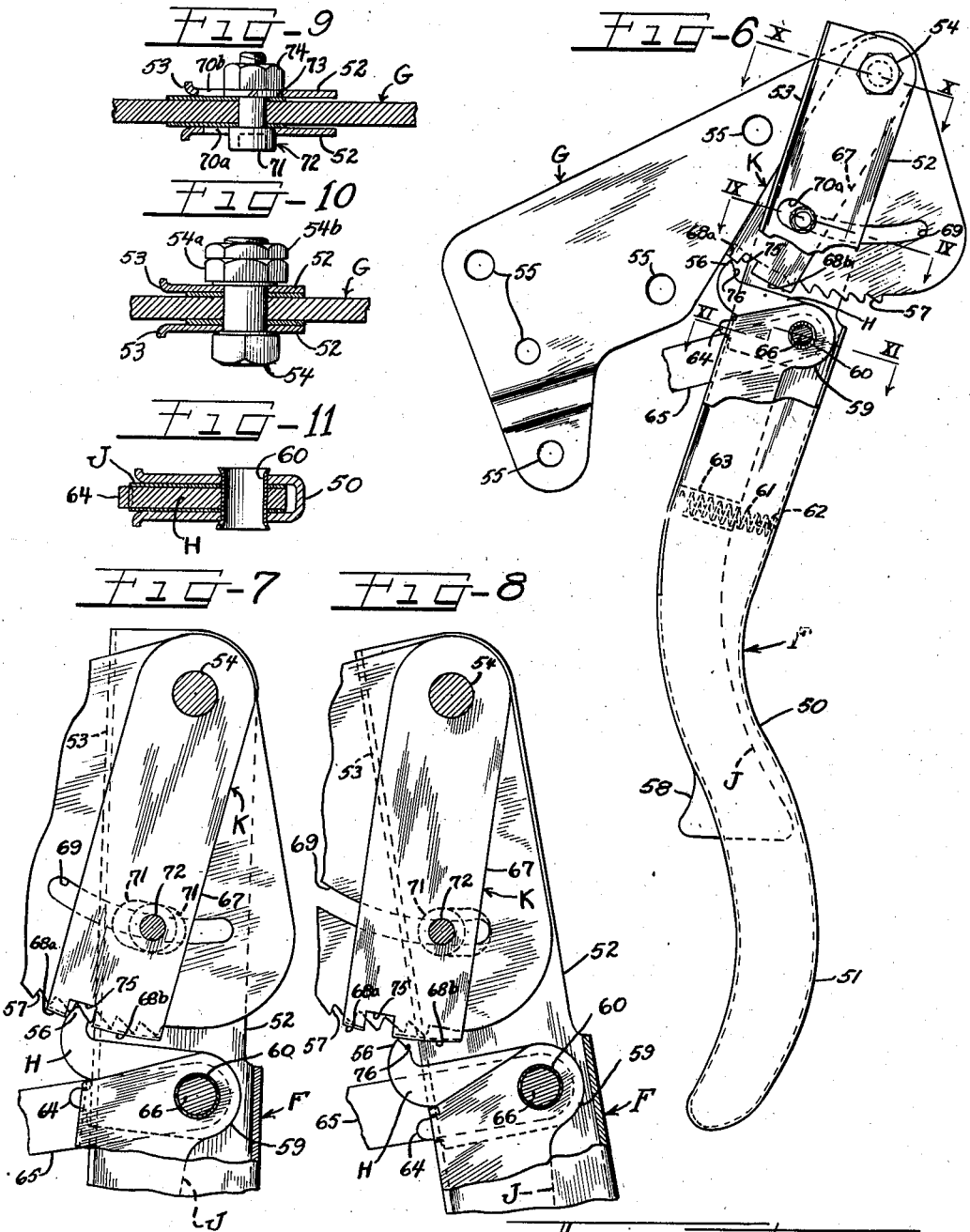
Inventor
Herbert S. Jandus
by Charles A. Mills Attys Patented Feb. 10, 1942

2,272,174

UNITED STATES PATENT OFFICE 2,272,174

BRAKE LEVER

Herbert S. Jandus, Detroit, Mich., assignor to Houdaille-Hershey Corporation, Detroit, Mich., a corporation of Michigan Application January 20, 1940, Serial No. 314,757

12 Claims. (Cl. 74—537)

The present invention relates to a novel brake lever, and more particularly, to a brake lever of the pawl and ratchet type which is provided with novel means for preventing clicking of the pawl over the ratchet as the lever is moved in either brake-setting or brake-releasing direction. This novel brake lever includes means for holding the pawl away from the ratchet during movement of the lever in either direction and for engaging the pawl with the ratchet at any selected adjusted position along the amplitude of brake lever swing.

The brake lever of this invention also includes manually operable means for releasing the pawl at any selected brake-setting position. It further provides means for positively maintaining the pawl in this position as the lever is swung to a full brake-releasing position, either by force exerted by the operator or by tension exerted by the braking mechanism, thereby eliminating drag on the brakes experienced with the usual lever by failure of the operator to sufficiently move it in a brake-releasing direction.

A brake lever of this type eliminates the objectionable features of clicking noises made by a pawl when riding along the ratchet teeth as the lever is swung in a brake-setting direction and in the resultant wear and damage to the teeth of the pawl and ratchet.

Another objection frequently experienced is the prevalent practice of only partially releasing the brake lever when it is swung to a brake-releasing position. Many drivers grasp the release means for rendering the pawl inoperative and rely upon the brake rod tension to swing the lever to a brake-releasing position. In most instances the pawl engages the ratchet before the lever reaches a full brake-releasing position allowing the vehicle to be operated with the brakes partially set or dragging, thereby causing needless brake wear.

It is therefore an object of the present invention to provide a brake lever wherein the clutching members are capable of being rendered inoperative whenever the lever is swung in either brake-setting or brake-releasing directions.

Another object of this invention is the provision of a brake lever construction of the pawl and ratchet type in which the pawl is held in spaced relationship to the ratchet to render them inoperative in either swinging direction of the lever.

A still further object of this invention is to provide means, operative with the brake lever, which automatically holds the pawl away from the ratchet when the lever is swung in a brake-setting direction and which allows the pawl to engage the ratchet with holding action when the lever is swung in the reverse direction.

Another and further object of the present invention is the provision of means, operative with the brake lever in lagging relation thereto, which automatically effects a disengagement of the pawl and ratchet when the brake lever is swung in a brake-setting direction and which effects toothed engagement therebetween when the lever is swung in the opposite direction.

The present invention has for a further object the provision of means, operative with and in lagging relation to the brake lever, which holds the pawl away from the ratchet as the brake lever is swung in either one of its two swinging directions and to effect a toothed engagement therebetween when the brake lever is swung in the opposite direction.

This invention has for a further object the provision of means which coacts with the manually operated pawl release means and the swinging brake lever to hold the pawl in positively spaced relation to the ratchet when the lever is swung in either direction.

A further object of the present invention is to provide a brake lever of the pawl and ratchet type with spaced shielding means adjacent the ratchet teeth wherein the pawl and ratchet may cooperate in toothed engagement only between said shielding means.

A still further object of this invention is to provide a brake lever of the pawl and ratchet type with spaced shielding means, adjacent the ratchet teeth and operable with the brake lever, against which the pawl is held during movement of the brake lever.

The novel features believed to be characteristic of this invention are set forth with particularity in the appended claims. The invention itself, however, both as to its organization and manner of construction, together with further objects and advantages thereof, may best be understood by reference to the following description, taken in connection with the accompanying drawings, in which:

Figure 1 is a view in side elevation of a brake lever constructed in accordance with the principles of the present invention, showing it in partial brake-setting position with the clutching members engaged in toothed holding relation;

Figure 2 is an enlarged fragmental view in side elevation with portions cut away, of the lever of the present invention showing it in a full brake-released position with the pawl held out of toothed engagement with the ratchet by means of a stirrup member;

Figure 3 is a view, similar to Figure 2, showing the lever in a full brake-setting position with the pawl held out of engagement with the ratchet by means of a different portion of the stirrup member;

Figure 4 is an enlarged fragmental sectional view, with parts in elevation, taken substantially along the plane indicated by line IV—IV of Figure 1;

Figure 5 is an enlarged fragmental sectional view, with parts in elevation, taken substantially along the planes indicated by the offset lines V—V of Figure 1;

Figure 6 is a view in side elevation, with a central portion cut away, of another embodiment of the present invention, showing the lever in a full brake-released position with the pawl held out of toothed engagement with the ratchet by means of a stirrup member, in the same manner as shown in Figure 2;

Figure 7 is an enlarged fragmental vertical sectional view, with parts in elevation, of the upper part of the brake lever illustrated in Figure 6, showing the relative positions of parts when the pawl and ratchet are in toothed engagement;

Figure 8 is a view, similar to Figure 7, showing the relative position of parts when the pawl is held out of toothed engagement with the ratchet as the lever is swung in a brake-setting direction;

Figure 9 is an enlarged fragmental sectional view, with parts in elevation, taken substantially along the plane indicated by the line IX—IX of Figure 6;

Figure 10 is an enlarged fragmental sectional view, with parts in elevation, taken substantially along the plane indicated by the line X—X of Figure 6;

Figure 11 is an enlarged sectional view taken substantially along the plane indicated by the line XI—XI of Figure 6; and Figure 12 is an enlarged fragmental section, as taken along the plane indicated by the line XII—XII of Figure 1, illustrating the operative connection between the release member and pawl.

As shown on the drawings:

In the embodiment of the present invention shown in Figures 1 to 5, inclusive, there is included a mounting plate or bracket A of flat metal stamped to proper size and form and provided with apertures or bolt holes 15 whereby it may be secured in place behind the instrument board of an automotive vehicle to support the brake lever B in dependent relation therefrom.

The brake lever B has a body portion 16 of U-shape in cross-section terminating at one end in spaced legs 17 and at its other end in an enclosed tubular handle portion 18.

The spaced legs 17 are suitably apertured to receive a pivot pin 19 for pivotally securing the lever B to the support A in dependent relation behind the instrument board of an automotive vehicle. As viewed from the side, the brake lever B extends downwardly in reverse curves to position the handle portion 18 below the lower margin of the instrument board in a freely accessible position.

A release member C, formed of flat metal and stamped to a U-shape configuration in section for a major portion of its length, is provided at its lower end with an enclosed digitally operable portion 20 (Figure 1) and at its upper end with spaced legs 21 (Figures 2, 3 and 5).

Each of the spaced lever legs 17 are suitably apertured below the pivot 19 to receive outwardly extending trunnions 22 formed in the spaced legs 21 of the release member C to constitute the pivotal connection therebetween. The lever B and the release member C are pivotally connected together in nested relation with their webs facing inwardly.

A coil spring 23, having one end positioned by an inturned portion 24 of the lever web and its other end held by a rounded seat 25 pressed in the side walls of the release member C, normally urges the release member in a projected operative position.

A flat pawl D, of L-shape in side view, has one leg formed to provide a tooth portion 26 for engaging ratchet teeth 27 formed on an arcuate margin of the plate A, the ratchet so formed and the pawl constituting clutching members for holding the lever member B in adjusted position.

The pawl D is pivoted to the side walls of the U-shaped portion of the lever member B by means of a pivot pin 28, which pin passes through suitable elongated apertures 29 provided in the side walls of the release member C. By providing the elongated apertures 29, relative movement between the release member C and the lever B around the trunnion pivot 22 is made possible.

As best shown in Figure 1, actuation of the pawl D into and out of toothed engagement with the ratchet 27 by means of the release member C is effected by a pair of dimples 30, only one of which is illustrated in this Figure 1. These dimples are struck inwardly from the side walls of the release member C into abutment with each other and engage the straight edge of the downwardly extending leg of the pawl D, as shown in Figure 12. The pawl D is normally urged into cooperating engagement with the ratchet by means of a coil spring 32, one end of which is positioned in a slot 33 provided in the leg 31 of the pawl member and at its other end by an inturned portion 34 struck inwardly from the web of the lever member B (Figures 2 and 3).

As best shown in Figures 2, 3, and 5, a stirrup or shielding member is formed of thin flat metal of U-shape in edge view. The stirrup E generally provides a pair of spaced parallel legs 35 which frictionally straddle the side surfaces of the bracket A and are connected at a pair of adjacent ends thereof by a pair of spaced web portions 36a and 36b. These web portions constitute teeth against which the pawl tooth 26 engages, as will be explained more fully hereinafter.

At their free ends, the spaced legs 35 are suitably apertured to hang in pivotal depending relation from the pivot 19 in close straddling relation with the side surfaces of the bracket A and with the shielding webs 36a and 36b in closely spaced relation from the ratchet teeth 27.

Each of the spaced legs 35 are provided with lugs 37, which are struck outwardly therefrom and positioned within the trunnions 22. The width of the lugs 37 is sufficiently less than the inside diameter of the trunnions 22 to provide for lost motion therebetween so as to allow the pawl tooth 26 to bridge the slot 38, between the stirrup webs 26a and 36b, as the lever member B is moved in either direction and before co-movement between the lever member and the stirrup E is effected (Figures 2 and 3).

An arcuate slot 39, like the sector edge formed by the ratchet teeth 27, is provided in the bracket A having edges formed by radii struck from the center of the pivot pin 19 and through which passes a bolt 40, extending through lugs 41 provided in adjacent edges of the stirrup (Figures 2, 3, and 4). By properly threading the bolts 40 by nuts 40a, sufficient tension is provided between the side surfaces of the bracket A and the stirrup E to allow for the lagging action previously explained. The coaction between bolt 40 and the slot 39 also defines the amplitude of free swinging movement of the lever member B.

A clevis 42 connects the brake operating rod mechanism (not shown) to the brake lever member B by means of a pivot pin 43, such as a bolt, rivet or the like, and which passes through elongated slots 44 in the side walls of the release member C to allow for relative movement between the release and lever members.

With the parts positioned as illustrated in Figure 2, when the driver of the vehicle grasps the handle of the brake lever and pulls it in a brake-setting direction, or to the right, the drag provided by the friction between the stirrup and bracket and the lag created by the difference in the width of the lug members 37 and the inside diameter of the trunnions 22, allows the lever member to swing the pawl D from its toothed seated relation with the web 36a to a similar seated relation with the web 36b. Tension of the coil spring 32 urges the pawl tooth 26 against the web of the stirrup member, and, in sliding from one web portion to its adjacent web portion, the slanting tooth face 26a effects a camming action with the leading corner of the web 36b over which the pawl tooth slides.

The relationship of the parts is then as illustrated in Figure 3 and movement of the brake lever is continued in a brake-setting direction until the brakes are fully set or the lever is moved to the limit of its swinging amplitude.

When the vehicle driver releases his grip on the lever member, tension of the brake mechanism tends to move the brake lever in the reverse direction. Due to the lagging action between the lever member B and the stirrup member E, the pawl and lever member move toward a brake-releasing direction only sufficiently to allow toothed engagement between the pawl tooth 26 and a ratchet tooth 27 lying within the stirrup slot 38. In this position, the lever member is positively held in its adjusted position (Figure 1).

By exerting digital pressure against the portion 20 of the release member C, disengagement of the clutching cooperation between the pawl and the sector is effected after which a slight movement of the brake lever member B in a brake-releasing direction positions the pawl tooth below the web 36a. When the vehicle driver releases his digital grip on the release member C, the coil spring 32 again effects a seating engagement between the pawl tooth 26 and the stirrup web 36a and tension of the brake mechanism is sufficient to pull the inoperative lever construction to a full brake-released position, which limit is defined by the abutment between the bolt 40 and the end of the arcuate slot 39.

It should be noted, that the spacing of the pawl and ratchet is automatically effected when the lever member is moved in a brake-setting direction and the clutching cooperation therebetween is effected and maintained by tension of the brake mechanism only. Actuation of the release member C is necessary only to rock the pawl out of toothed engagement into its seating relation with the web portion 36a after which tension of the brake mechanism automatically effects a full brake-released position of the brake lever mechanism.

Another embodiment of the brake lever construction is illustrated in Figures 6 to 11, inclusive. The form of lever herein illustrated is generally designated by the reference character F, having a body of U-shaped cross-section 50 with a curved enclosed handle 51 at one end thereof and spaced parallel legs 52 at its other end.

The spaced legs 52 have their inner adjacent edges 53 turned outwardly and the flat portions of the legs are suitably apertured to receive a pivot pin 54, such as a bolt, rivet or the like, for pivotally securing the lever shaft to a support bracket G. Suitable apertures or bolt holes 55 are provided in the bracket G whereby it may be secured in place behind the instrument board of an automotive vehicle to support the brake lever F in dependent relation with its handle below the lower margin of the instrument board.

A flat pawl H is formed with a tooth 56 for engaging ratchet teeth 57 formed on an arcuate margin of the bracket G by a radius struck from the pivot 54, the ratchet so formed and the pawl constituting clutching members for holding the lever member F in adjusted position.

A release member J, formed of flat metal and stamped to a U-shaped configuration in cross-section for a major portion of its length, is provided at its lower end with a closed digitally operable portion 58 (Figure 6) and at its upper end with spaced offset legs 59 (Figures 6, 7, and 8).

The pawl H and the release member J are pivotally connected to the side walls of the lever F by means of a hollow pivot 60, the three members being positioned in nested relation with the webs of the lever and release members facing inwardly towards each other.

A coil spring 61, having one end held in place by a lug 62 struck inwardly of the lever member web and its other end held by a pressed rounded depression 63 formed in the side walls of the release member J (Figure 6), normally urges the release member to a projected operative position.

Operative connection between the release member J and the pawl H is effected by the provision of a lug 64, formed on the pawl below the toothed portion 56, which extends through an opening provided in the web of the release member (Figures 7, 8, and 11). By this connection the pawl is rocked into and out of cooperative holding engagement with the ratchet teeth 57.

A clevis 65 provides the usual connection between the brake lever F and the operating brake rod mechanism (not shown) by means of a pivot pin 66 which passes through the hollow pivotal member 60.

A stirrup or shielding member K, U-shaped in edge view, is suitably apertured at the free ends of the legs 67 to pivotally hang from the lever pivot 54, on which the depending members are held together by lock nuts 54a and 54b. The connecting web portions 68a and 68b, which form the U-shaped ends of the stirrup are arranged in movable and spaced relation from the ratchet teeth 57. As best illustrated in Figures 6, 7, and 8, these web portions constitute seats against which the tooth portion 56 of the pawl H engages to hold the pawl out of cooperating engagement with the ratchet teeth.

An arcuate slot 69, having edges formed by radii struck from the center of the pivot pin 54, is provided in the bracket G intermediate the ratchet teeth 57 and the pivotal connection 54.

A similar but much shorter elongated slot, in registry with the slot 69, is provided in each of the lever legs 52. As best shown in Figure 9, the lever leg slot 70a is slightly shorter in length than the slot 70b in the opposite leg to provide for the difference in diameters between the head 71 of the bolt 72, which extends through the aforementioned slot, and the lock washer 73 against which the nut 74 is threaded.

The straddling relation between the side surfaces and the bracket G and the legs 67 of the stirrup K, affords a sliding frictional engagement therebetween.

When the driver of the vehicle grasps the handle of the brake lever and pulls it in a brake-setting direction, the frictional engagement between the stirrup and the bracket results in the stirrup member holding its position until the free ends of the slots 70a and 70b coact with the bolts 72 to effect co-movement between the stirrup and the lever F. The difference in relative lengths of the lever leg slots 70a and 70b and the respective included portions of the bolt 72, provides sufficient lost motion to allow the pawl tooth 56 to be displaced from the web portion 68a to the web portion 68b. In other words, the lost motion before co-movement is effected between the brake lever F and the stirrup K is sufficient to allow the pawl tooth to bridge the slot 75 which separates the adjacent webs 68a and 68b.

The slanting edge 76 of the pawl tooth 56 allows the pawl to slide from one stirrup web to its adjacent web portion in the same manner as described in the previous embodiment. Continued pull on the handle of the brake lever actuates the brakes to the desired adjusted position. Upon release of the grip by the driver, tension of the brake mechanism tends to move the brake lever in a counter direction whereby the lost motion allows the pawl tooth to slide from the stirrup web 68b into toothed engagement with a ratchet tooth 57 lying within the slot 75.

To release the brake lever mechanism from its holding adjusted position, the driver of the vehicle merely actuates the digital portion 58 of the release member J to rock the pawl out of toothed engagement with its cooperating ratchet and tension of the brake mechanism pulls the lever forward through the remainder of the lost motion to seat the pawl tooth against the web portion 68a, after which the brake mechanism tension moves the entire brake lever construction to a fully brake-released position as shown in Figure 6.

While in this embodiment, the pawl and release members are illustrated as being separate parts, they may be made integral to perform their individual functions equally as well. It should be noted that the functions and the results obtained in each of the embodiments are alike.

The invention is described herein more or less precisely as to details, yet it is to be understood that the invention is not to be limited thereby, as changes may be made in the arrangement and the proportions of parts, and equivalents may be substituted, without departing from the spirit and scope of the invention.

I claim as my invention:

1. A lever construction comprising a lever arranged for pivotal connection to a support, cooperating clutching members for holding said lever in adjusted position, means manually operable for rendering said clutching cooperation inoperative, and additional means coaxially pivoted with said lever to said support for partially shielding one of said clutching members to hold the other of said members out of cooperation therewith when the lever is swung in one direction and to allow said clutching members to cooperate when swung in the opposite direction.

2. A brake lever construction comprising a lever having a handle at one end and spaced legs at the other end for pivotal connection to a support, cooperating clutching members for holding said lever in adjusted position, a clutch release member for unclutching said cooperating members, a U-shaped member straddling said support, friction means between said U-shaped member and said support for creating a drag therebetween, said U-shaped member being arranged for movement with said lever in lagging relation thereto by reason of said drag, and teeth formed on said U-shaped member for carrying one of said clutching members out of clutching cooperation when said lever is moved in either direction.

3. A ratchet, a lever pivoted to said ratchet, a pawl adapted to cooperate with said ratchet for holding said lever in adjusted position, a release member for unclutching said pawl and ratchet, and a stirrup having side walls straddling said ratchet and being pivotally connected thereto coaxially with said lever, said stirrup having a slot in a web portion connecting said side walls and positioned adjacent the teeth of said ratchet, said pawl and ratchet cooperating with holding action only when said pawl extends through said web slot, one of the web portions adjacent said slot automatically holding the pawl out of clutching cooperation with said ratchet when said lever is moved in one direction and the other web portion adjacent said slot holding the pawl out of clutching cooperation with said ratchet when said pawl is rocked out of said cooperation by said release member when the lever is moved in the opposite direction.

4. A brake lever construction comprising a lever having a handle at one end and spaced legs at its other end pivotally connected to a support, a ratchet sector on said support, a pawl adapted to cooperate with said sector to hold said lever in adjusted position, a clutch release member operable for rocking said pawl out of holding engagement with said sector, a U-shaped stirrup having spaced side walls and a connecting web portion at one end thereof, the free ends of said side walls arranged to pivot coaxially with said lever pivot, said webbed portion having a transverse slot defining flat seats on either side thereof, said pawl and ratchet co-operating with holding action only through said web slot, said stirrup and lever coacting with lagging action whereby said pawl is rocked out of clutching cooperation into seating engagement against one of said flat seats when said lever is swung in one direction and rocked back into clutching cooperation when the lever is swung in the opposite direction.

5. A brake lever construction comprising a lever having a handle at one end and spaced legs at its other end pivotally connected to a support, a ratchet sector on said support, a pawl adapted to cooperate with said sector to hold said lever in adjusted position, a clutch release member operable for rocking said pawl out of holding engagement with said sector, a U-shaped stirrup having spaced side walls and a connecting web portion at one end thereof, said stirrup straddling said sector with its web portion adjacent the sector teeth and arranged to pivot coaxially with said lever pivot, said web portion having a slot defining adjacent flat seats, said clutching cooperation being effected through said slot only, and struck out portions of said side walls engaging said lever with lost motion to effect a lagging co-movement between said stirrup and lever when the latter is moved in either direction, said lagging action being effective to rock said pawl along one of said flat seats into and out of clutching cooperation with said sector by movement of the lever, said pawl being rocked out of clutching cooperation by said release member and maintained in seated relation against the other of said flat seats when the lever is moved in one direction only.

6. A brake lever construction comprising a support, a lever having a handle at one end and spaced legs at its other end, said spaced legs straddling said support and pivotally connected thereto, a ratchet sector on said support, a pawl adapted to cooperate with said sector to hold the lever in adjusted position, a clutch release member having an opening through which extends a portion of the pawl whereby the pawl is rocked out of holding engagement with said sector, a U-shaped stirrup having spaced side walls and spaced connecting web portions at one end, said side walls arranged to frictionally straddle the side surfaces of said support and to hang in pivotal depending relation from said lever pivot, said spaced lever legs and support having elongated slots in registry, a bolt passing through said slots and coacting with the ends of the support slot to define the swinging amplitude of said lever, said elongated slots in the spaced lever legs coacting with said bolt and additional apertures in said stirrup to allow for relative movement between said lever and stirrup for a portion of the swing of said lever and to allow co-movement therebetween for the balance of said lever swing in either direction, the angularity of said relative movement being such as to allow for displacement of the pawl from one web portion of the stirrup to its adjacent web portion, said pawl and ratchet cooperating with holding action only when the pawl extends between said spaced web portions of said stirrup.

7. A clutching construction comprising a plurality of clutching members normally cooperating in holding engagement, a shielding member arranged for movement along one of said clutching members, and movable means connecting said shielding member and another of said clutching members for limited relative movement and for co-movement, said other clutching member being rocked by said movable means to a position in which said shielding member is interposed between said one and said other clutching members during said limited relative movement and being maintained therebetween during said co-movement.

8. A clutching construction comprising a plurality of clutching members normally cooperating in holding engagement, a shielding member pivotally connected to one of said clutching members, a movable member co-pivotally mounted with said shielding member, means pivotally connecting another of said clutching members to said movable member, and means connecting said movable member to said shielding member for limited relative movement and for co-movement therebetween, said other clutching member being rocked by said movable member to a position in which said shielding member is interposed between said one and said other clutching members during said limited relative movement and being maintained therebetween during said co-movement.

9. A clutching construction comprising a support member, a movable member pivotally mounted thereon, said members having clutching parts normally cooperating in holding engagement, a shielding member pivotally mounted on said support member for movement about the same axis as said movable member and having a portion thereof masking a portion of one of said clutching parts, and means connecting said shielding member and said movable member for relative movement about their common pivot axis between a position where said shielding member is interposed between said clutching parts and a position where said clutch parts are in holding engagement with each other.

10. A clutching construction including a plurality of relatively movable clutching members normally cooperating in holding engagement, a shielding member having a portion extending transversely across one of said clutching members, movable means connected to said shielding member for movement of the portion of said shielding member along said one clutching member, and a connection between said movable means and another of said clutching members for rocking the latter to a position in which said shielding member portion is interposed between said one and said other clutching members and to a position where said last clutching members are in holding engagement with each other.

11. A clutching construction comprising a plurality of clutching members normally cooperating in holding engagement, a shielding member arranged for movement along one of said clutching members, a movable member carrying another of said clutching members, and a lost motion device connecting said movable member and said shielding member for limited relative movement and for co-movement therebetween, said other clutching member being rocked by said movable member to a position in which said shielding member is interposed between said one and said other clutching members during said limited relative movement and being maintained therebetween during said co-movement.

12. A brake lever construction comprising a support member, a shielding member having sidewalls straddling said support member, a lever having spaced legs straddling said shielding member, a pivot connecting said lever and said shielding member to said support, an elongated slot in said support member, elongated slots in said lever legs in registry with each other and with the slot in said support member, a member frictionally connecting said shielding member and said support having an enlarged end slidingly seated in one of said slots in the lever legs and engaging a sidewall of said shielding member, a shank on said connecting member extending through said shielding member sidewalls and said slot in the support member, said connecting member having adjustable means at its other end tightly engaging the sidewall of said shielding member opposite the side wall engaged by said enlarged ends and being seated within the other of said slots in the lever legs, said elongated slots coacting with said connecting member to effect limited relative movement between said lever and said shielding member for a portion of the swing of said lever and to effect co-movement therebetween for the balance of said lever swing.

HERBERT S. JANDUS.